Aug. 24, 1965 T. D. READER 3,202,373

TAPE TRANSPORT WITH NON-LINEAR BUFFER LOOP BOXES

Filed Jan. 8, 1962

INVENTOR
TREVOR D. READER

BY William G. Miller Jr.
AGENT

United States Patent Office 3,202,373
Patented Aug. 24, 1965

3,202,373
TAPE TRANSPORT WITH NON-LINEAR BUFFER LOOP BOXES

Trevor D. Reader, Wayne, Pa., assignor to Sperry Rand Corporation, New York, N.Y., a corporation of Delaware Filed Jan. 8, 1962, Ser. No. 164,794
4 Claims. (Cl. 242—55.12)

This invention relates to loop boxes for tape transports and more particularly to a vacuum loop box arrangement providing a small buffer loop so that only a minimum length of tape need be initially accelerated when tape motion is started.

In the past, tape transport systems have utilized vacuum loop boxes as a means for storing variable lengths of tape between each reel and the driving capstan in order to provide for the great divergence between the acceleration rates of the capstan and the reels. These variable lengths are herein referred to as loose lengths although they are generally taut. To futher improve the ability of a capstan to accelerate the tape rapidly past a work station, as for example in magnetic tape recording apparatus used in storing digital data, some systems have utilized two vacuum loop boxes between each reel and the drive capstan with one of the loop boxes being used to provide the greater part of the required storage of tape while the other loop box (the box closest to the capstan), is small in capacity and serves only to shorten the length of tape requiring acceleration initially. These small boxes have been called buffer boxes and have utilized tapered sides with flat, plane surfaces so that a proper distribution of tape between the boxes could be maintained. Such tapered boxes have, however, generally provided a tape tension which was a substantially linear function of the length of the tape looped therein.

Systems utilizing such tapered boxes have had the disadvantage of having a natural frequency at which sustained oscillations of the tape loops occurred, due to the intermittent motion of the capstan.

It is accordingly an object of this invention to provide an improved buffer loop box for preventing such oscillations of the tape.

It is a further object of this invention to provide a buffer loop box which minimizes abrasion of the tape.

It is another object of this invention to provide a simpler, less costly and more compact transport system for tape.

In carrying out the objects of this invention there is provided a tape transport for moving tape between a first area from which the tape is accelerated at a relatively slow rate and a second area from which it is accelerated at a rapid rate past a work station. The path between these areas being by way of a large tape storage loop adjacent the first area and a small tape buffer loop adjacent the second area. Means are provided for applying tension to the loops so that at least the tension established in the tape by the buffer loop is inversely related to the length of tape therein in a manner having substantial non-linearity, the word "inversely" in this context being used to indicate that as the length of tape increases the tension decreases.

The foregoing objects, advantages, construction and operation of the invention will became readily apparent from the following description in conjunction with the drawings in which.

Figure 1:
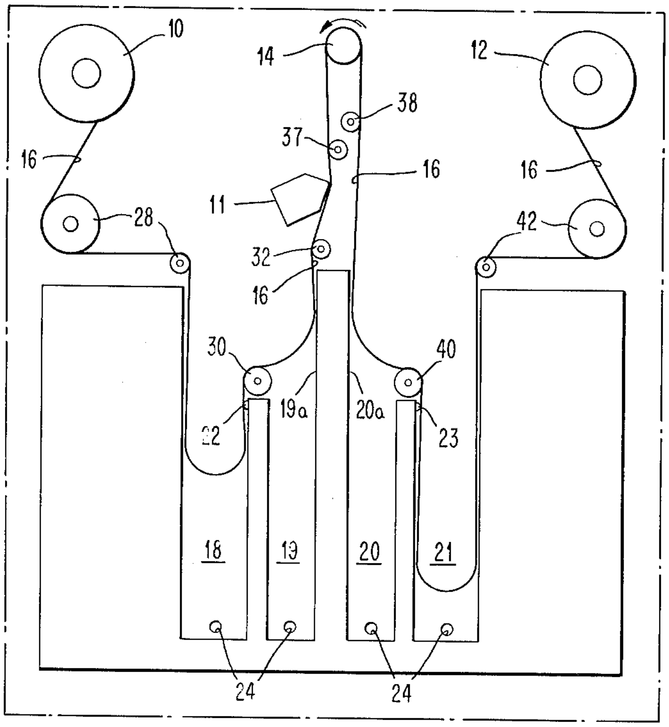
FIGURE 1 shows a tape transport system utilizing the present invention.

The tape transport system as shown in FIGURE 1 provides for the transporting of tape such as magnetic recording tape from a supply reel 10 past a work station such as magnetic head 11 to a take-up reel 12 the primary driving force being provided by capstan 14. In tape transports of this type when it is necessary to provide by the capstan 14 a maximum acceleration of the tape 16 past read head 11 it is necessary to interpose between the capstan 14 and each of the reels 10 and 12 loose lengths of tape which will accommodate the difference between the rate at which the capstan can accelerate and the rate at which the reels 10 and 12 can be accelerated. The loose lengths of tape 16 may be retained in chambers taking the form of loop boxes 18–21. These loop boxes are usually designed to have a depth between their front face, which is frequently transparent, and the back face just slightly greater than the normal width of the tape 16, and the boxes are normally connected with a source of vacuum as by way of ports 24 in their back face.

The tape path in FIGURE 1 is arranged to follow from supply reel 10 around idler rollers 28 and thence into and out of storage loop box 18 and thence over the relatively small surface area of idler roller or bearing member 30 and into and out of buffer loop box 19. From box 19 the tape 16 passes over idler roller 32, into contact with the surface of the reading and recording head 11 over idler roller 37, capstan 14 and idler roller 38. From idler roller 38 the tape path then leads into and out of the buffer loop box 20, over idler roller or bearing member 40, into and out of loop box 21, and over idler rollers 42 to take-up reel 12.

As it is necessary to maintain a sufficient quantity of tape in the large loop boxes 18 and 21 which provide the majority of the storage capacity to accommodate accelerations of decelerations of driving capstan 14, the lengths of the loops in loop boxes 18 and 21 are normally controlled by any of several well known arrangements for energizing the drive motor of the nearest reel to maintain the loop lengths in each of the boxes 18 and 21 at their desired value. The loop lengths shown in FIGURE 1 are, for example, those required for optimum operation when the next action of the tape transport is either a starting of the driving capstan 14 from a static condition to rotation in a backward direction as indicated by the arrow. The same relative loop lengths are also desirable for the stopping of the driving capstan 14 from an operating condition in which it is turning in a forward direction causing the tape to move from the supply reel 10 to take-up reel 12. Considering the tape to the right of capstan 14 in the first case, namely the starting of the drive capstan 14 from a static condition, it will be evident that the capstan 14 is required, in the arrangement as shown in FIGURE 1, to accelerate only the length of tape between the capstan 14 and the buffer loop boxes 20 since the tape contained in the loop box 21 will not be caused to move out of that box until the tension on the tape 16 between the loop box 21 and the buffer box 20 is such that there is an unbalance sufficient to overcome the frictional forces so as to move tape from loop box 21 into buffer box 20. Thus by using a buffer box such as 20 in which is stored only a minimum length of tape to accommodate the initial accelerations of the driving capstan 14 these initial accelerations may be of greater magnitude and may be accomplished more quickly than would be the case if it were necessary for the driving capstan 14 to accelerate a greater length of tape such as that between the capstan 14 and the bottom of the loop contained in loop box 21.

Considering now the tape to the left of capstan 14 it is evident that simultaneously with the pulling of tape from loop box 20 the driving capstan 14 will tend to relieve the tension in the tape in the region of head 11. The acceleration of the tape 16 past head 11 is thus dependent upon the tension established in the length of tape between capstan 14 and loop box 19 by virtue of the vacuum in loop box 19. To make it unnecessary for the tension in the tape to be higher than necessary and to accomplish this acceleration quickly the length of tape in the tape path between capstan 14 and loop box 19 is designed to be a minimum amount. For the same reason the capacity of the buffer loop boxes 19 and 20 are designed to be a minimum for any increase in their capacity would also result in an increase in the amount of tape requiring acceleration initially.

As the tape is drawn into buffer loop box 19 there will be a resulting decrease in the tension in the tape as established by the loop in box 19, as explained hereinafter, so that the tension due to the vacuum in loop box 18 causes the tape 16 to move from buffer box 19 into loop box 18 to thus maintain the desired distribution of tape as between buffer box 19 and loop box 18.

It has been found that when buffer loop boxes are constructed to provide a substantially linear relationship between the length of the tape loop contained therein and the tension established thereby there is a tendency for the tape to oscillate between the buffer box and the storage loop box when the tape is moved at certain rates, in dependence upon the natural frequency of the system. To avoid such oscillations this invention provides a buffer box so constructed that there is substantial non-linearity in the relationship between the length of the tape loop in the buffer box and the tape tension established by that loop.

Figure 2:
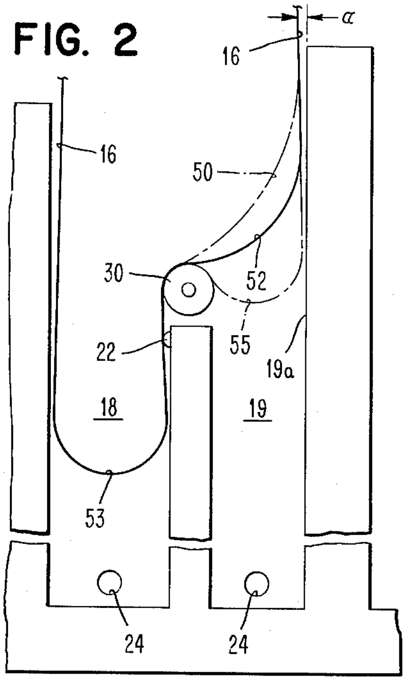
FIGURE 2 shows an enlarged view of the loop box and a buffer box in accordance with the present invention.

This non-linearity is best shown by reference to FIGURE 2 which shows in an enlarged view storage loop box 18 and buffer loop box 19 as well as the idler roller 30 which forms a bearing element carrying the tape through a region in which the tape path direction is changed as the tape moves between storage loop box 18 and buffer loop box 19.

When only a very short length of tape 16 is looped into buffer box 19, as shown by the dashed line identified by the reference numeral 50, its free length, namely that length between the point of contact of the tape with bearing 30 and the point at which the loop becomes tangent to and begins to conform with the straight side 19*a* of buffer loop box 19, forms a substantially circular arc having a radius which is relatively large. The tension established in the tape by virtue of the vacuum in the buffer box 19 causing a differential pressure across the arcuate length 50 will be relatively large since the tension is directly related to the radius of the free length of tape in the buffer loop box.

The tape 16 would form an arcuate loop such as 50 during an initial acceleration of the tape in a forward direction and when such a short length of tape is contained in buffer box 19 the tension in the tape due to that loop is sufficient to overcome the tension in the tape which is established by storage loop box 18. Since box 18 has sides which establish parallel flat planes along the tape path in the box the tension due to a loop of tape contained therein is a constant value regardless of the length of the loop when the tape is not accelerating. Therefore, when the loop in buffer box 19 is at 50 tape will be accelerated from box 18 towards box 19 and after slight oscillation the desired length of loop in box 19 will be re-established, for example that length of loop indicated by the solid line identified by reference numeral 52.

When the loop length in buffer box 19 forms the arcuate loop shown as 52, the radius of the free portion of that loop will be smaller than the radius established by the arcuate loop 50 and, therefore, the tension in the tape due to the vacuum existing below the loop in the buffer loop box 19 will be smaller and will be desirably of the same value as the tension in the tape as established by storage loop box 18. Thus, the radius of the arcuate length 52 is essentially identical to the radius of the arc established by the free length of the loop of tape in loop box 18 shown as 53.

When tape is moved in a reverse direction so that an initial acceleration of the capstan causes tape to be spilled into the buffer loop box 19, the longer length of tape in box 19 establishes a free length generally arcuate in form such as the free length identified by reference numeral 55. This free length will have a radius which is less than that of loops 50 and 52 and will also thus establish in the tape a tension less than that established by storage loop box 18. As a result, tape will be pulled from buffer loop box 19 into storage loop box 18 in order to re-establish in buffer loop box 19 a loop such as 52 to again provide the desired distribution of tape between buffer box 19 and loop box 18 in anticipation of subsequent accelerations.

In the event that the tape loop in storage loop box 18 approaches a length sufficient to occupy the entire loop box it will gradually relieve the vacuum under the loop as the bottom of the loop passes port 24. Under such conditions if additional tape continues to be spilled from reel 10 into box 18 a like amount will be drawn from box 18 into buffer box 19 which will then serve as storage for the excessive lengths by acting as a rectangular box similar to loop box 18. The free length of the loop in box 19 will for such excessive quantities have a constant radius and the tension thus established in the tape will remain constant and at a value just sufficient to maintain the length of the loop in box 18 so that its free length falls across port 24 partially relieving the vacuum in box 18.

It is thus evident that under normal conditions buffer box 19 is designated to store small lengths of tape with the lengths of the loops generally being sufficiently small so that the arcuate length of the loop is less than 180° so that there is a substantial non-linear relationship, as previously mentioned. Under abnormal conditions, however, box 19 can act as storage for long lengths of tape.

It will be evident that as the loop in buffer loop box 19 varies between the position shown by 50 to the position shown by 55 the relationship of the radius of the free length of that loop to the total length of the loop will be non-linear. This non-linear relationship serves to prevent unwanted oscillations of the tape between buffer loop box 19 and storage loop box 18.

For optimum operation of loop boxes such as buffer loop boxes 19 and 20 as well as storage loop boxes 18 and 21 of FIGURE 1 it is necessary that the tape path be such that it approaches any surface such as surface 19*a* in buffer loop box 19 or surface 20*a* in buffer loop box 20 at a relatively shallow angle $\alpha$, as shown in FIGURE 2. Preferably this angle should be less than 10° in order that there should be no instability resulting from the air flow normally present between the box side such as 19*a* and the tape 16 adjacent to it. Bumpers 22 and 23 are provided in loop boxes 18 and 21 respectively, to maintain the desired small angle on one side of these boxes. The tape which generally conforms to the surfaces such as 19*a* thus is caused to float thereover to prevent friction generating contact between the tape loop and the surface.

It is also desirable to provide a long coupling path between buffer loop box 19 and buffer loop box 20 to prevent any interaction therebetween due to a change in loop length in one of the buffer loop boxes. Such a change in loop length, particularly if it is rapid, tends to change the pressure difference across the other buffer loop by changing the pressure under the loop if there is close coupling between the buffer loops. Such interaction would contribute to the setting up of unwanted oscillations.

It will be evident from the above description and an examination of FIGURES 1 and 2 that the buffer loop box in that embodiment is basically an arrangement which provides means for establishing a pressure difference across a free length of tape which is draped to form a loop wherein one extreme of the free length is established by contact with the relatively small area of the surface of a bearing element such as 30 which may in the limited condition to be considered as a line, with the other end of the free length being established where the tape path is constrained to a conformation with a surface. This surface is spaced from the bearing element so that neither it nor an extension of its would intersect the bearing element and the surface extends from one area in the tape path through areas which are more distant from the bearing element than the said one area. As has been pointed out above with such an arrangement a non-linear relationship is provided between the tension in the tape, as established by the pressure differential across the free length, and the total length of tape in the loop, including the free length of the loop as well as that portion of the tape 16 falling along and conforming to the abovementioned surface.

While the description of FIGURES 1 and 2 has been in terms of a buffer loop across which the pressure differential is established by virtue of the connection of the closed box area in which the tape is looped to a source of reduced pressure or vacuum, other means may be utilized to establish the pressure differential. An example of such other means would be the establishment of a pressure higher than atmospheric in all areas of the apparatus except those areas under the loops in the loop boxes. The operation of the apparatus in such an arrangement would be similar to that of the arrangement of FIGS. 1 and 2.

Figure 3:
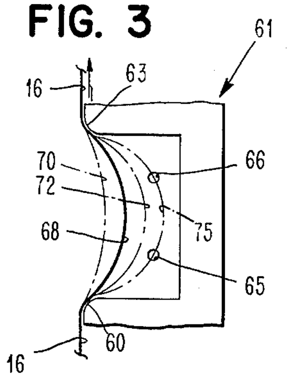
FIGURE 3 shows another structure for a buffer box in accordance with the present invention.

The non-linear relationship required between the tension established by the buffer loop and the length of tape forming that loop may be accomplished by other arrangements, such as that shown in FIGURE 3. In FIGURE 3 the path of the tape 16 leads over a bearing surface 60 at one edge of vacuum loop box 61. Loop box 61 may have a box shape as shown in FIG. 3 and may be placed in the tape path as a substitute for boxes 19 and 20 of FIGURE 1. From the bearing surface 60 to the tape loops into and out of the box 61 and upon leaving the box leads along another bearing surface 63 similar to bearing surface 60. The bearing surfaces 60 and 63 may, of course, be the surfaces of rotatable elements such as element 30 of FIGURES 1 and 2 instead of the stationary surfaces shown in FIG. 3.

The buffer loop box 61 is shown in FIGURE 3 as having two ports 65 and 66 which are connected to a source of reduced pressure so that a partial vacuum is drawn in the area under tape 16 in the loop box 61. This vacuum serves to cause that free length of tape 16 draped between the points of contact with the bearing surface 60 and the bearing surface 63 to take the form of a substantially circular arc. The loop 68 shown as a solid line represents a condition of static equilibrium corresponding to that described in FIGURE 2 for loop 52.

In the event that the tape 16 is accelerated in the direction of the arrow the radius of the free length of the loop in buffer loop box 61 will increase so that the free length of tape between the surfaces 60 and 63 follows a path shown by dashed line 70. Since the tension in the tape as established by the buffer loop box 61 is a function of the radius of the free length of tape between the bearing surface 60 and 63, when that length forms the loop 70 the tension in the tape is higher than normal. The loop 70 thus corresponds to the loop 50 shown in FIGURE 2. Similarly, an acceleration of the tape in a direction opposite to that indicated by the arrow would cause the loop of tape in box 61 to have a greater length such as loop 72. Since loop 72 has a smaller radius than static loop 68, the tension in the tape 16 would, therefore, be less than that established by loop 68. The loop 72 essentially corresponds to loop 55 in FIGURE 2.

With a buffer loop box having the configuration of box 61 it is possible to position the vacuum ports 65 and 66 so that as the free length of the tape loop in the box 61 forms an arc approaching 180° additional tape in the loop box will cause the loop to uncover portions of both ports 65 and 66 so that the pressure under the loop will not be as low as would otherwise be the case. Such a position of the tape loop is shown as 75. With such an arrangement a non-linear relationship between the loop length and the tension in the tape is established for loop lengths up to a certain value by virtue of the changing radius of the free length of the loop and the non-linearity for loop lengths exceeding that value, namely an arc of 180°, are provided by a gradual reduction of the pressure differential across the loop by virtue of the gradual uncovering of the vacuum ports 65 and 66 as the length of the loop is increased.

Thus, in contrast to the buffer loops shown in FIGURES 1 and 2 formed between a bearing element which may in the limited case be a line and a surface which does not intersect that line, the buffer loop box of FIGURE 3 demonstrates a construction in which the free length of the loop is determined by the amount of tape draped between points of contact with two bearing elements. These bearing elements may in the limited case be lines spaced along the tape path. As has been mentioned with regard to FIGURE 1, the pressure differential across the tape need not be produced by establishing a reduced pressure under the loop but instead may be produced by establishing a pressure greater than atmospheric over the loop while exposing the underside of the loop to atmospheric pressure.

Having thus described my invention as it relates to magnetic tape recording systems it will be evident to those skilled in the art that similar transports with buffer loops as described above may be utilized in handling other elongated flexible materials whether they be webs, tapes or sheets. The term tape is thus used herein to mean elongated flexible materials.

What is claimed is:

1. A tape recording unit comprising a supply reel, a take-up reel, a capstan operable to engage the tape for movement between said supply reel and said take-up reel along a predetermined tape path, a recording head positioned along said tape path adjacent said capstan, first and second vacuum loop boxes interposed between said capstan and each of said supply reel and said take-up reel, said first vacuum loop boxes each having sides which establish parallel flat plane surfaces along said tape path, the capacity of each of said first vacuum loop boxes being sufficient to store a loop of tape adequate to accommodate normal differences in acceleration rates as between said capstan and said supply reel and said take-up reel, said second vacuum loop boxes each being positioned along the tape path at a point closer to said capstan than each of said first vacuum loop boxes, a rotatable guide along said tape path between each of said first and second vacuum loop boxes, said guides each being operable to carry said tape as the tape path changes direction between the area where it leaves each of said first vacuum loop boxes to the area where it enters each of said second vacuum loop boxes, each of said second vacuum loop boxes having a side nearest said capstan which forms a flat plane surface along the tape path and which extends upwardly a predetermined distance from a location opposite from the corresponding rotatable guide in a manner to provide a free length of tape between each of said rotatable guides and the area at which said tape begins to conform to said plane surface of said side of each of said second loop boxes such that there is established in each of said second loop boxes a loop of tape maintaining an arcuate length of less than 180° and sufficient to accommodate initial accelerations of said capstan and provide a non-linear relationship between the length of tape in each of said second loop boxes and the tape tension resulting therefrom.

2. A tape recording unit comprising a supply reel, a take-up reel, a capstan operable to engage the tape for movement of the tape between said supply reel and said take-up reel along a predetermined tape path, a recording head positioned along said tape path adjacent said capstan, first and second vacuum loop boxes interposed between said capstan and each of said supply reel and said take-up reel, said first vacuum loop boxes each having sides which establish parallel flat plane surface along said tape path, the capacity of each of said first vacuum loop boxes being sufficient to store a loop of tape adequate to accommodate normal differences in acceleration rates as between said capstan and said supply reel and said take-up reel, means for relieving the vacuum in each of said first vacuum loop boxes when the length of tape looped therein approaches the capacity of the corresponding loop box, said second vacuum loop boxes each being positioned along the tape path at a point closer to said capstan than each of said first vacuum loop boxes, a rotatable guide along said tape path between each of said first and second vacuum loop boxes, said guides each being operable to carry said tape as the tape path changes direction between the area where it leaves each of said first vacuum loop boxes to the area where it enters each of said second vacuum loop boxes, each of said second vacuum loop boxes having sides which establish parallel flat plane surfaces with one of said sides terminating just beneath corresponding ones of said guides and the other of said sides extending from the location on said other side closest to said corresponding guides along the tape path to a location more distant from said corresponding guides, the spacing between said sides of each of said second loop boxes being less than the spacing between said sides of each of the corresponding ones of said first loop boxes, each of said second loop boxes normally providing a free length of tape having an arcuate length of less than 180° between the corresponding ones of said rotatable guides and the area at which said tape begins to conform to said plane surface of the said other of said side of each of said second loop boxes such that there is established in each of said second loop boxes a small loop of tape sufficient only to accommodate initial accelerations of said capstan and provide a non-linear relationship between the length of tape in each of said small loops and the tape tension resulting therefrom, each of said second loop boxes also being operable to accommodate additional lengths of tape when the length of the loop of tape in the corresponding one of said first loop boxes approaches its capacity.

3. A tape recording unit comprising: a supply reel, a takeup reel, a capstan operable to engage the tape for movement between said supply reel and said takeup reel along a predetermined tape path, a recording head positioned along said tape path adjacent said capstan, first and second loop boxes disposed between said capstan and said supply reel and said capstan and said takeup reel, respectively, each of said loop boxes comprising, first and second sections, said first and second sections being separated by a wall member shorter than the outside walls defining the loop box, said wall member being closer to the side wall of said second section than that of said first section, means connecting a source of vacuum to said first and second sections whereby the arcuate lengths of tape disposed in said first and second sections normally tend to equalize.

4. A tape recording unit comprising: a supply reel, a takeup reel, a capstan operable to engage the tape for movement between said supply reel and said takeup reel along a predetermined tape path, a recording head positioned along said tape path adjacent said capstan, first and second loop boxes disposed between said capstan and said supply reel and said capstan and said takeup reel, respectively, each of said loop boxes comprising, a storage section and a buffer section, said storage section and said buffer section separated by a wall member shorter than the outside walls defining the loop box, said wall member being closer to the side wall of said buffer section than that of said storage section, means connecting a source of vacuum to said storage and buffer sections providing equal values of vacuum in each of said sections whereby the arcuate lengths of tape disposed in said first and second sections normally tends to equalize.

References Cited by the Examiner

UNITED STATES PATENTS

| | | | |
|---|---|---|---|
| 3,016,207 | 1/62 | Comstock | 242—55.12 |
| 3,091,408 | 5/63 | Schoeneman | 242—55.12 |

FOREIGN PATENTS

| | | |
|---|---|---|
| 230,942 | 10/60 | Australia. |
| 1,163,105 | 9/58 | France. |
| 847,821 | 9/60 | Great Britan. |

OTHER REFERENCES

"IBM Technical Disclosure Bulletin," August, 1959, page 8, volume 2, No. 2.

MERVIN STEIN, *Primary Examiner.*

HARRISON R. MOSELEY, *Examiner.*